United States Patent
He

(10) Patent No.: US 12,448,807 B2
(45) Date of Patent: Oct. 21, 2025

(54) TENT TOP BASE STRUCTURE

(71) Applicant: Linhai Meideng Lighting Co., Ltd., Taizhou (CN)

(72) Inventor: Long He, Taizhou (CN)

(73) Assignee: Linhai Meideng Lighting Co., Ltd., Taizhou (CN)

( * ) Notice: Subject to any disclaimer, the term of this patent is extended or adjusted under 35 U.S.C. 154(b) by 259 days.

(21) Appl. No.: 18/228,916

(22) Filed: Aug. 1, 2023

(65) Prior Publication Data

US 2024/0218694 A1 Jul. 4, 2024

(30) Foreign Application Priority Data

Dec. 31, 2022 (CN) .......................... 202211737532.4

(51) Int. Cl.
*E04H 15/10* (2006.01)
*E04H 15/34* (2006.01)

(52) U.S. Cl.
CPC ............. *E04H 15/10* (2013.01); *E04H 15/34* (2013.01)

(58) Field of Classification Search
None
See application file for complete search history.

(56) References Cited

U.S. PATENT DOCUMENTS

| | | | |
|---|---|---|---|
| 6,840,657 B2* | 1/2005 | Tung | A45B 3/04 362/183 |
| 7,331,684 B2* | 2/2008 | Tung | A45B 3/04 362/183 |
| 7,481,547 B2* | 1/2009 | Li | A45B 3/00 362/431 |
| 9,968,168 B2* | 5/2018 | Ma | A45B 3/02 |
| 10,233,664 B2* | 3/2019 | Choi | E04H 15/10 |
| 10,633,883 B2* | 4/2020 | Zhu | F21V 21/088 |
| 11,486,161 B2* | 11/2022 | He | E04H 15/48 |
| 2005/0059428 A1* | 3/2005 | Tung | A45B 3/00 455/556.1 |
| 2007/0151588 A1* | 7/2007 | Yul | E04H 15/50 135/135 |
| 2007/0211450 A1* | 9/2007 | You | A45B 3/04 362/245 |
| 2008/0053496 A1* | 3/2008 | Li | A45B 3/02 135/21 |

FOREIGN PATENT DOCUMENTS

CN 213205185 U * 5/2021 ............. E04H 15/10

* cited by examiner

*Primary Examiner* — David R Dunn
*Assistant Examiner* — Danielle Jackson
(74) *Attorney, Agent, or Firm* — Kirk A. Wilson; Joseph T. Guy; Patent Filing Specialist Inc.

(57) ABSTRACT

A tent top base structure is provided, belonging to the technical field of tent top bases. The tent top base structure includes a lamp holder and a power storage holder for mounting a power source. The power storage holder is detachably connected to the lamp holder. A mounting frame for placing a lamp fixture is arranged in the lamp holder. A wire-passing hole communicating with an inner cavity of the power storage holder is formed in the lamp holder. The mounting frame is provided with a clamping groove with an opening facing downwards. The tent top base structure also includes a pressing plate connected to the lamp holder, the pressing plate is partially embedded in the clamping groove and blocks the opening of the clamping groove, and a wire-passing gap is formed between an upper end of the pressing plate and a top wall of the clamping groove.

17 Claims, 9 Drawing Sheets

TENT TOP BASE STRUCTURE

CROSS-REFERENCE TO RELATED APPLICATION

This patent application claims the benefit and priority of Chinese Patent Application No. 202211737532.4 filed with the China National Intellectual Property Administration on Dec. 31, 2022, the disclosure of which is incorporated by reference herein in its entirety as part of the present application.

TECHNICAL FIELD

The present disclosure belongs to the technical field of tent top bases, and relates to a tent top base structure.

BACKGROUND

In existing tent structures, multiple hooks are arranged on an inner top wall of the tent, and then lighting lamps are hung on the tent to achieve the illumination of the inside of the tent. The lighting lamps can be hung on the hooks only when the lighting lamps are provided with parts corresponding to the hooks. Moreover, as the tent is generally tall after being spread out, it is difficult for people to hang lighting lamps on the inner top wall of the tent only depending on their own height, which leads to difficult use of the tent under poor illumination.

The existing lighting fixture and the power pack for supplying power to the lighting fixtures are usually directly and electrically connected on the tent top base. The lighting fixture is usually arranged with LED lamp sheets, so when electrically connected to the power pack, the electric wire is usually directly used for connection. Moreover, the lighting fixture will shake during mounting, the electric wire needs to be fixed, so the electric wire is usually directly pressed between the lampshade and the base. At this time, the lampshade and the base are fixedly connected by bolts or clamping fitting. Shaking or size error may occur after the lampshade and the base are fixedly connected, resulting in unstable fixing of the electric wire, or the electric wire is clamped too tightly, such that the electric wire is continuously squeezed during the process that the lampshade and the base are pressed against each other during mounting. In addition, as it is not only necessary to align the lampshade with the base, but also to clamp the electric wire at the corresponding position during mounting, the electric wire clamped between the lampshade and the base can be damaged, which affects the service life of the lighting fixture and the stability of power supply of the lighting fixture.

SUMMARY

For the above problems existing in the prior art, an objective of the present disclosure is to provide a tent top base structure. The technical problem to be solved by the present disclosure is how to solve the problem of poor stability of power supply of the existing tent top base structure.

The objective of the present disclosure is achieved through the following technical solutions.

A tent top base structure including a lamp holder, and a power storage holder for mounting a power source is provided. The power storage holder is detachably connected to the lamp holder. A mounting frame for placing a lamp fixture is arranged in the lamp holder. A wire-passing hole communicating with an inner cavity of the power storage holder is formed in the lamp holder. The mounting frame is provided with a first clamping groove with an opening facing downwards. The tent top base structure further includes a pressing plate connected to the lamp holder. The pressing plate is partially embedded in the first clamping groove and blocks the opening of the first clamping groove, a wire-passing gap which is configured for an electric wire to pass through is formed between an upper end of the pressing plate and a top wall of the first clamping groove and the wire-passing gap communicates with the wire-passing hole.

An operation principle of the structure is as follows: a power source in the power storage holder may be a storage battery and/or a solar panel. By forming the first clamping groove with the opening facing downwards in the mounting frame and arranging the pressing plate in the first clamping groove, the opening of the first clamping groove is blocked by the pressing plate at the moment, and the wire-passing gap is formed between the pressing plate and the top wall of the first clamping groove, such that the electric wire of the lamp fixture placed on the mounting frame can pass through the wire-passing gap and the wire-passing hole in turn to enter the power storage holder and is electrically connected to the power source in the power storage holder. When the tent top base structure is mounted, a tarpaulin is arranged between the power storage holder and the lamp holder, and the whole lamp holder is generally located in the tarpaulin. Therefore, the electric wire can be pressed against the wire-passing gap by the pressing plate during mounting, and damage caused by the contact between the electric wire and an inner housing of the lamp holder during mounting when the electric wire is directly led out from the first clamping groove is avoided. As the electric wire is pressed between the pressing plate and the top wall of the first clamping groove through the cooperative arrangement of the pressing plate and the first clamping groove, it is difficult to touch the electric wire during mounting, the stability of the electric wire during mounting and use is guaranteed, the power supply for the lamp holder is more stable, and the stability of the tent top base structure is further improved.

In above tent top base structure, the mounting frame includes an annular mounting ring and multiple connecting plates arranged in the mounting ring and connected to an inner side wall of the mounting ring. The first clamping groove is formed in the mounting ring, the pressing plate includes a mounting part arranged on the multiple connecting plates and a clamping part embedded in the first clamping groove. The lower end face of the clamping part is flush with a lower end face of the mounting ring.

By flushing the lower end face of the clamping part with the lower end face of the mounting ring, the lamp fixture is arranged on the mounting frame at the moment, such that the overall arrangement of the clamping part does not affect both a mounting structure of the mounting ring and the size of the wire-passing gap when the lamp holder is mounted, thus further improving the routing stability of the electric wire.

In above tent top base structure, the lamp holder includes a connecting cover connected to the power storage holder, and a lampshade pressed against the connecting cover. The mounting frame is arranged on the connecting cover, the clamping part is in a shape of an arc-shaped plate, an inner side of the clamping part is connected to the mounting part, a side wall of the clamping part adjoins a side wall of the first clamping groove, and the pressing plate is pressed against the multiple connecting plates by the lampshade.

Through the arrangement of the connecting cover and the lampshade, the overall illumination brightness of the lamp is between the lampshade and the connecting cover. Through the arrangement of the shape of the clamping part, the clamping part adjoin the mounting ring except at the position of the wire-passing gap, such that the reflective irradiation of the lamp fixture is not affected, and the lighting of the lamp fixture is not greatly affected while the routing stability is ensured.

In above tent top base structure, the lamp holder is provided with a guide plate inside the mounting ring, the guide plate is arranged directly opposite to the first clamping groove, a lower end face of the guide plate is slightly higher than the top wall of the first clamping groove, and a guide gap allowing the electric wire to pass through is formed between a lower end of the guide plate and the mounting part.

Through the arrangement of the guide plate, the electric wire led out from the wire-passing gap can be guided to the wire-passing hole of the lamp holder through the guide gap, and thus the routing of the electric wire is more stable. The arrangement of the guide plate does not affect the mounting of the pressing plate.

In above tent top base structure, the guide plate is arranged between two adjacent connecting plates, two sides of the guide plate are respectively connected to the two adjacent connecting plates, and a lower end face of the guide plate is a cambered face.

Through the arrangement of the structure, the arrangement of the guide plate is more stable, and the lower end face of the guide plate is a cambered face, such that a friction force on the electric wire during wiring is smaller, and the stability of the routing of the electric wire is further improved.

In above tent top base structure, an upper end of the mounting part is protruded to form a positioning post, and each of the multiple connecting plates is provided with a positioning slot for the positioning post to be inserted.

The coordinated arrangement of the positioning post and the positioning slot can achieve the circumferential positioning of the pressing plate, thus enabling the arrangement of the pressing plate to be more stable.

In above tent top base structure, the wire-passing hole is arranged obliquely above the guide plate, and the wire-passing hole is formed at the center of the connecting cover.

Through the position arrangement of the wire-passing hole, the electric wire led out from the guide gap can enter the wire-passing hole quickly, and thus the routing stability of the electric wire is further improved.

In above tent top base structure, an upper end of the lamp holder is provided with an annular scaling clamping ring, an outer side wall of the sealing clamping ring is provided with multiple clamping blocks in a circumferential direction, the power storage holder is provided with a circular positioning plate, and the positioning plate is provided with multiple second clamping grooves with side openings in a circumferential direction. The clamping block are slidable into the second clamping groove from the respective openings, and the lamp holder is provided with a heat dissipation port below each of the clamping blocks, and the heat dissipation port communicates with an inner cavity of the lamp holder.

Through the arrangement of the clamping block and the second clamping groove, the connection between the lamp holder and the power storage holder can be completed by rotating the lamp holder until the clamping block slides into the second clamping groove from a corresponding bayonet, and thus the connection between the lamp holder and the power storage holder is more stable. The lamp holder is provided with a heat dissipation port below each clamping block, on the one hand, the forming with the clamping block is convenient, the forming cost is reduced. On the other hand, the heat of the lamp fixture can be uniformly transferred into the power storage holder. As the power storage holder is located outside the tent, the heat dissipation effect is better, the heat dissipation effect of the lamp fixture is achieved, and the heat dissipation effect of the lamp fixture is further improved.

In above tent top base structure, the power storage holder includes a housing, the positioning plate is arranged on the housing, and the housing is provided with forming holes each of which corresponds to a corresponding one of the second clamping grooves, and each of the forming holes communicates with the corresponding one of the second clamping grooves.

Through the arrangement of the forming hole, on the one hand, the forming of the second clamping groove on the positioning plate is convenient, on the other hand, the heat of the heat dissipation port of the lamp holder can be transferred to the power storage holder through the forming hole rapidly, thereby further improving the heat dissipation effect of the lamp fixture.

In above tent top base structure, the lamp holder is provided with a scaling ring located outside the sealing clamping ring. In a case where the lamp holder is connected to the power storage holder, the scaling ring is attached to an outer side wall of the positioning plate.

Through the arrangement of the sealing ring, impurities such as external rainwater are prevented from entering the power storage holder or the lamp holder from the position the scaling ring and the positioning plate, thereby ensuring a better overall use environment of the whole tent top base structure. The lighting of the lamp fixture is not affected, and the waterproof and dustproof performance of the tent top base structure is improved.

In above tent top base structure, the power storage holder is provided with an annular protective ring, and the protective ring is arranged outside the positioning plate. In the case where the lamp holder is connected to the power storage holder, the sealing ring is located in the protective ring, and an avoidance space is formed between the sealing ring and the protective ring.

Through the arrangement of the protective ring, the protective ring play a primary role in blocking the heavy rain. Through the arrangement of the avoidance space, the arrangement of the protective ring does not affect the mounting between the lamp holder and the power storage holder, and the mounting efficiency of the tent top base structure is further improved.

Compared with the prior art, the tent top base structure has the following benefits. The electric wire can be pressed against the wire-passing gap by the pressing plate during mounting, thereby avoiding the damage caused by the contact between the electric wire and an inner housing of the lamp holder during mounting when the electric wire is directly led out from the clamping groove. As the electric wire is pressed between the pressing plate and the top wall of the first clamping groove through the cooperative arrangement of the pressing plate and the first clamping groove, it is difficult to touch the electric wire during mounting, the stability of the electric wire during mounting and use is guaranteed, the power supply for the lamp holder is more stable, and the stability of the tent top base structure is further improved.

Figure 1:
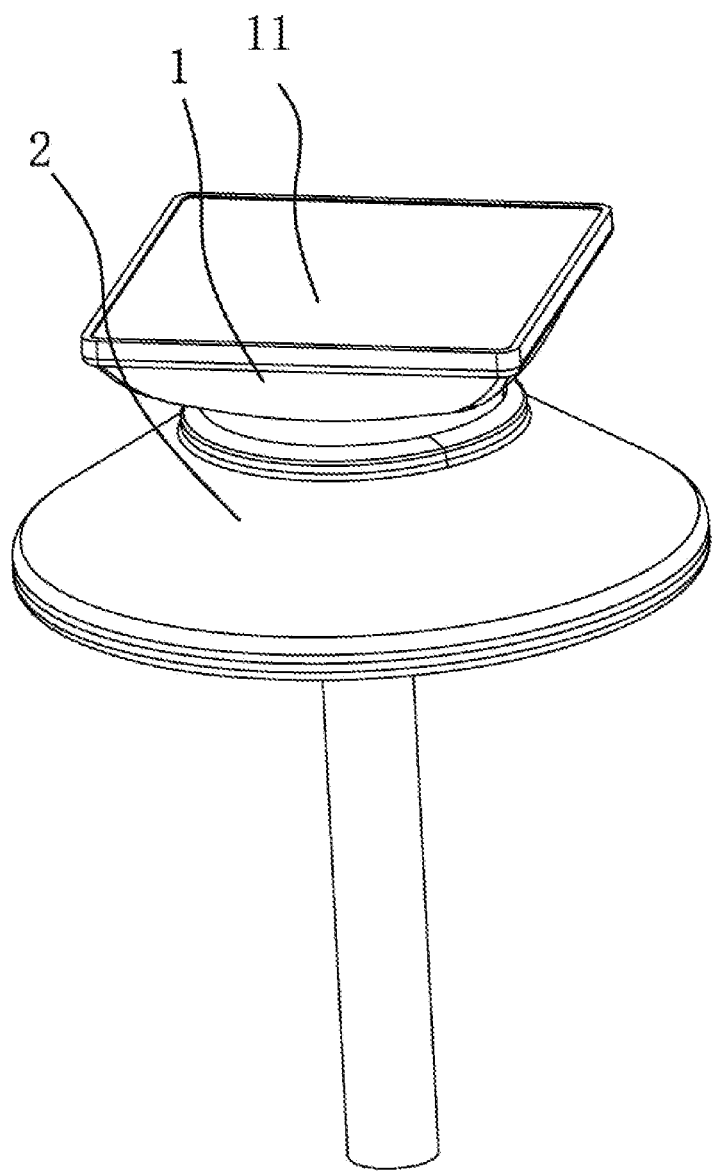
FIG. 1 is a schematic diagram of an assembly structure in accordance with the present disclosure.

In the drawings: 1 power storage holder; 11 power source; 12 positioning plate; 12a second clamping groove; 13 housing; 13a forming hole; 14 protective ring; 2 lamp holder; 21 lamp fixture; 22 connecting cover; 23 lampshade; 24 mounting frame; 24a first clamping groove; 24b opening; 24c mounting ring; 24c1 support strip; 24d connecting plate; 24d1 positioning slot; 24e connecting post; 25 wire passing hole; 26 guide plate; 27 guide gap; 28 scaling snap ring; 28a clamping block; 29 heat dissipation port; 210 sealing ring; 3 pressing plate; 31 mounting part; 31a positioning post; 32 clamping part; 4 wire passing gap; 5 avoidance space.

DETAILED DESCRIPTION OF THE EMBODIMENTS

The following are specific embodiments of the present disclosure, and the technical solution of the present disclosure will be further described with reference to the accompanying drawings, but the present disclosure is not limited to these embodiments.

Embodiment I

Figure 2:
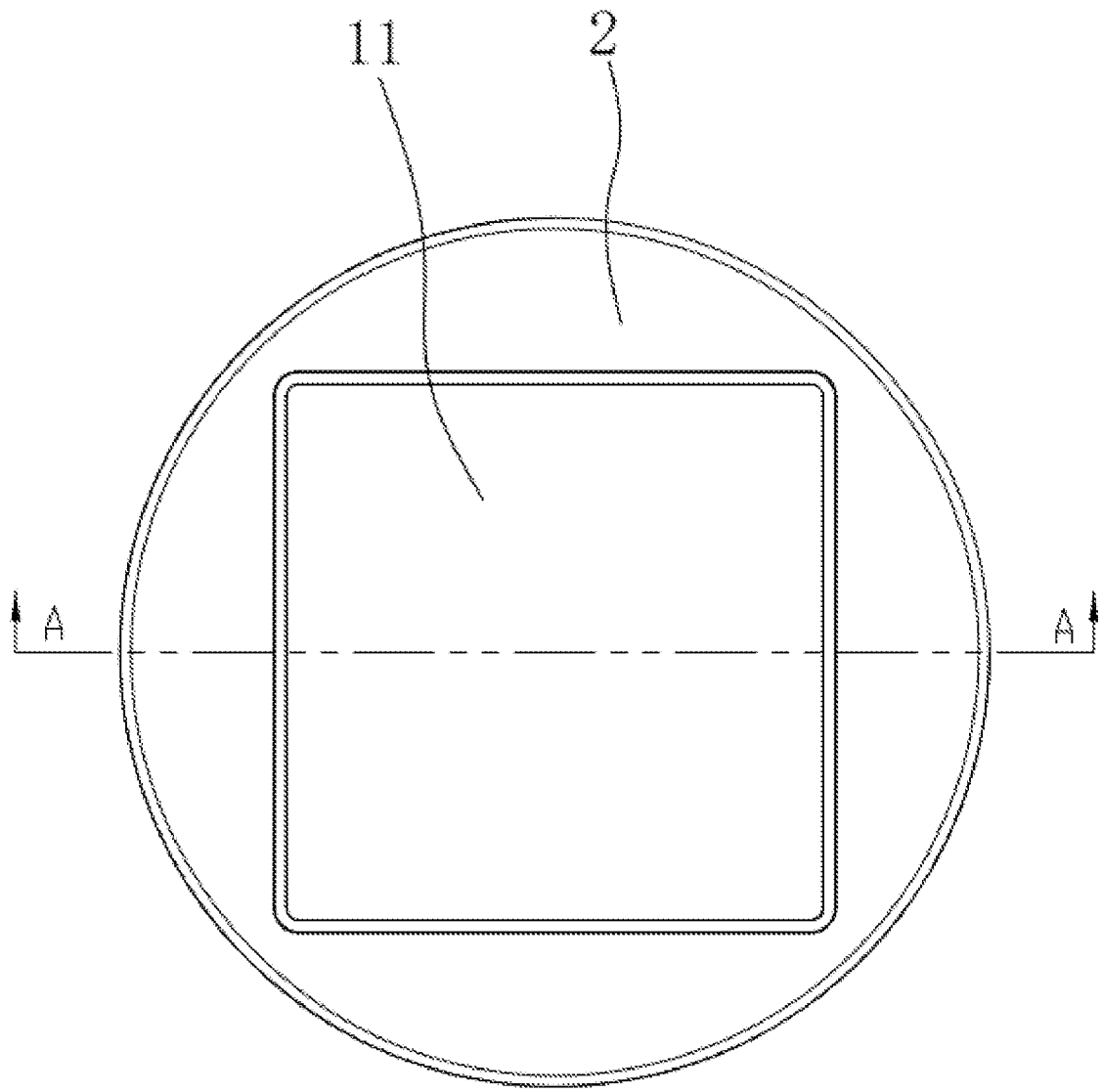
FIG. 2 is a top view in accordance with the present disclosure.
Figure 3:
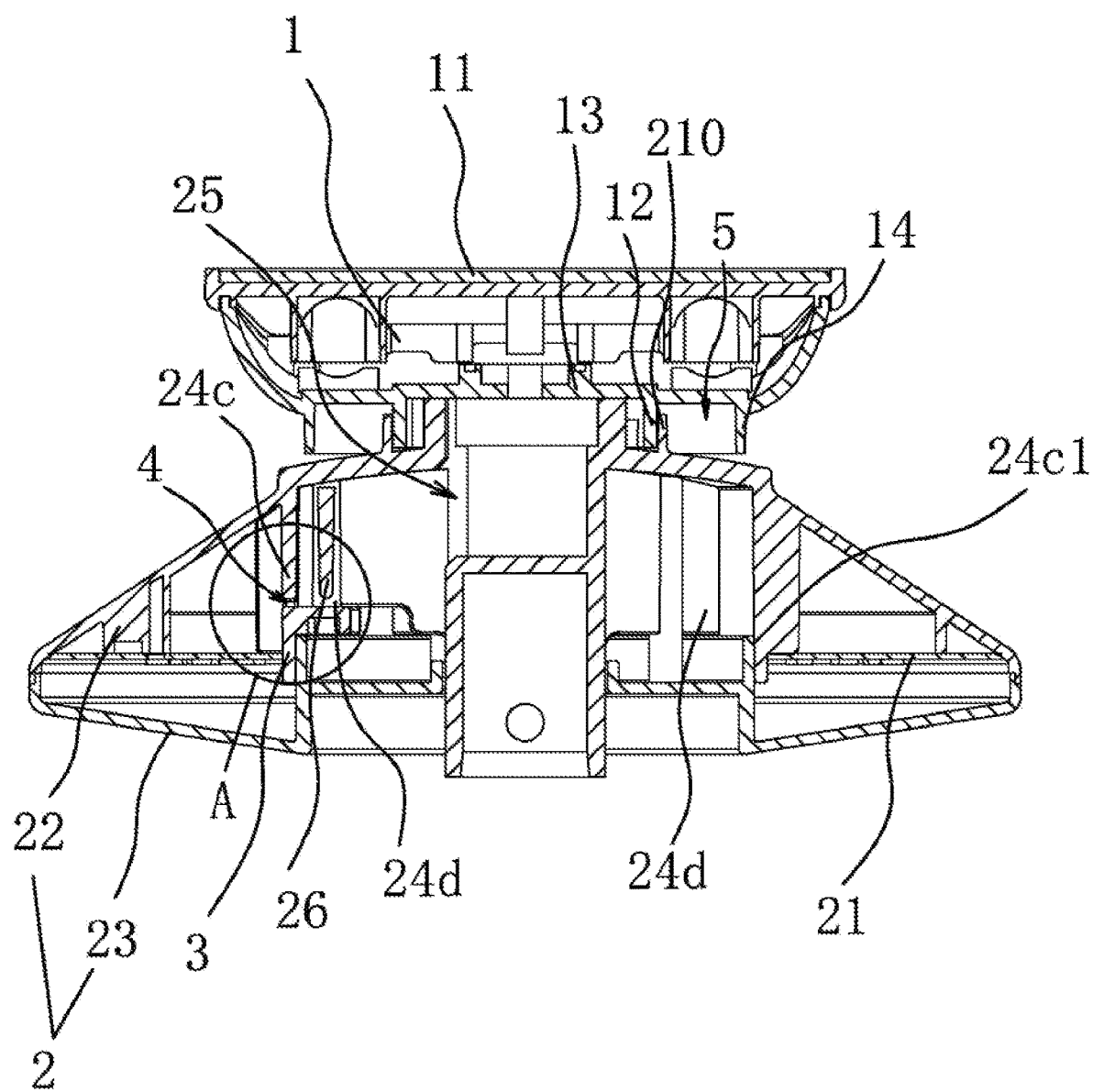
FIG. 3 is a section view of A-A in FIG. 2.
Figure 4:
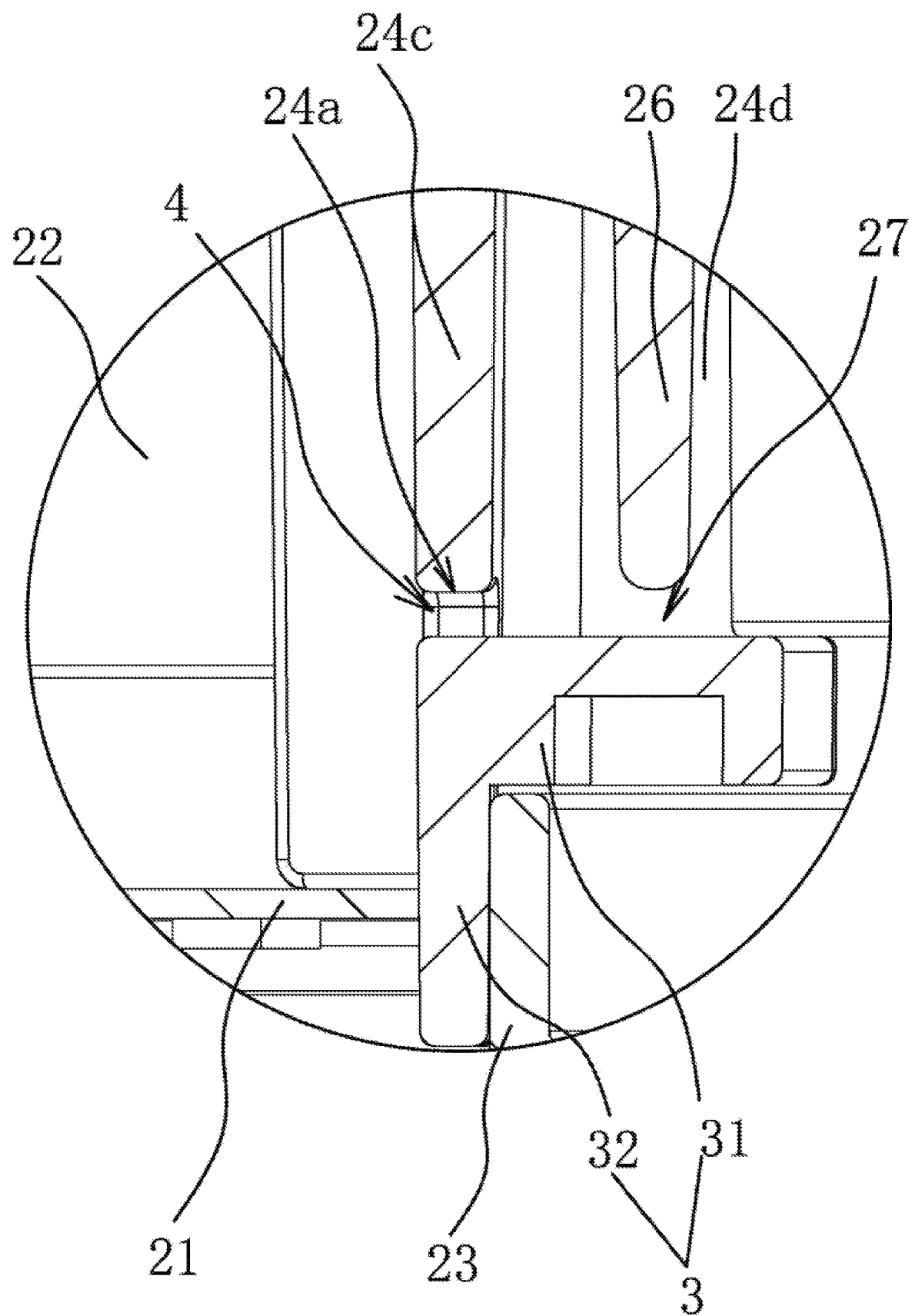
FIG. 4 is a partial enlarged view of position A in FIG. 3.
Figure 5:
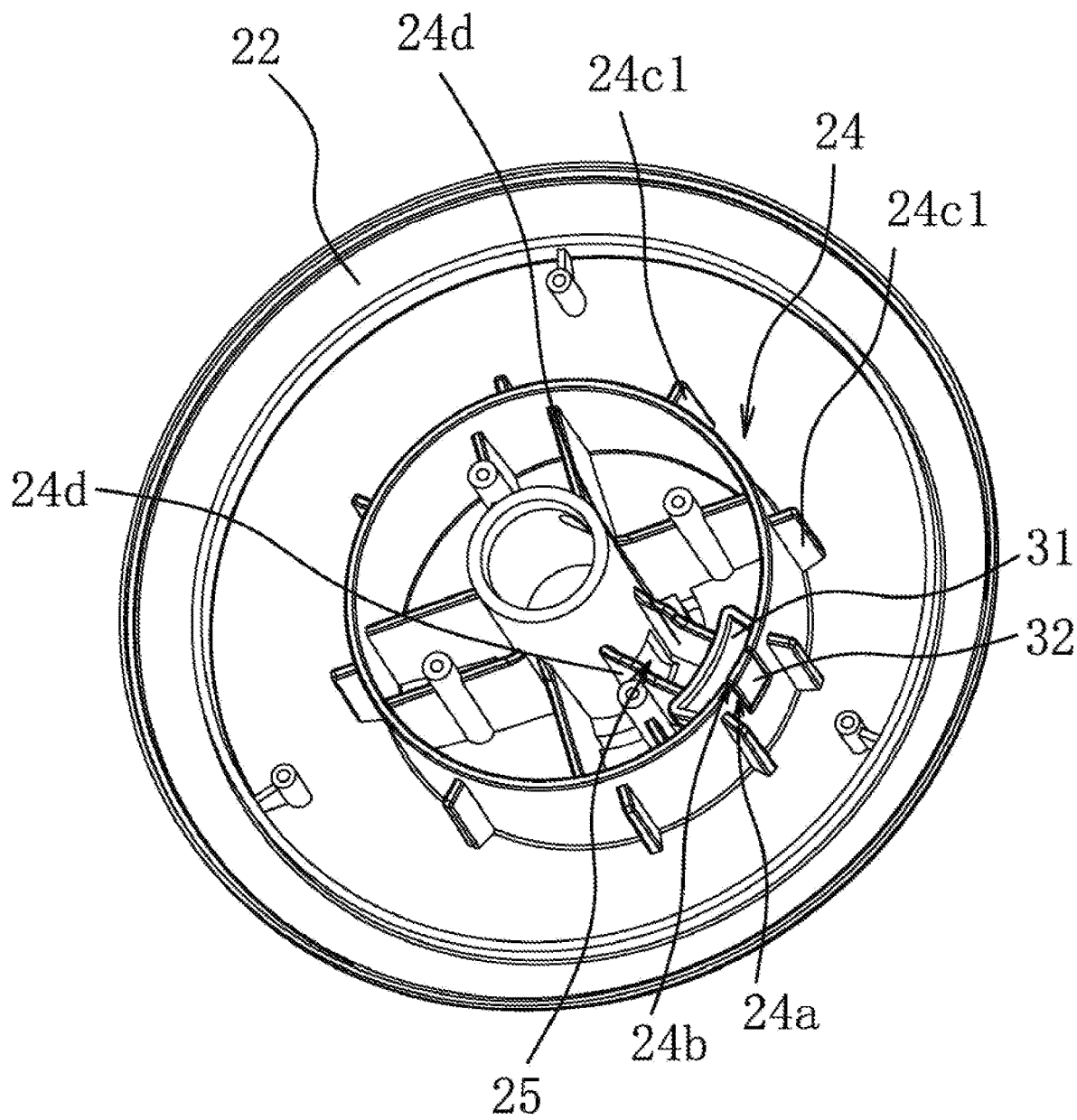
FIG. 5 is a structural schematic diagram of a bottom view after a connecting cover and a pressing plate are assembled in accordance with the present disclosure.
Figure 6:
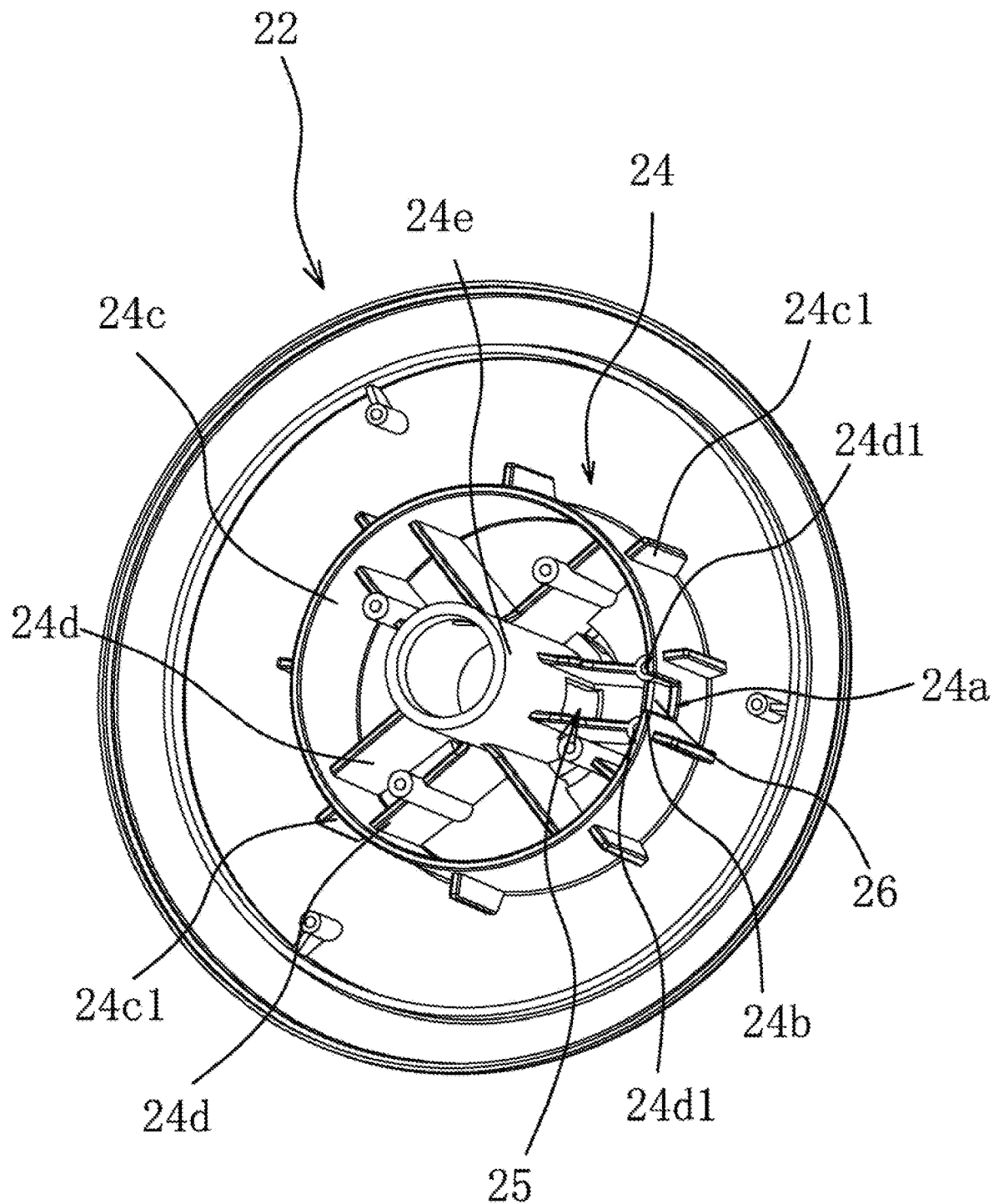
FIG. 6 is a structural schematic diagram of a bottom view of the connecting cover in accordance with the present disclosure.
Figure 7:
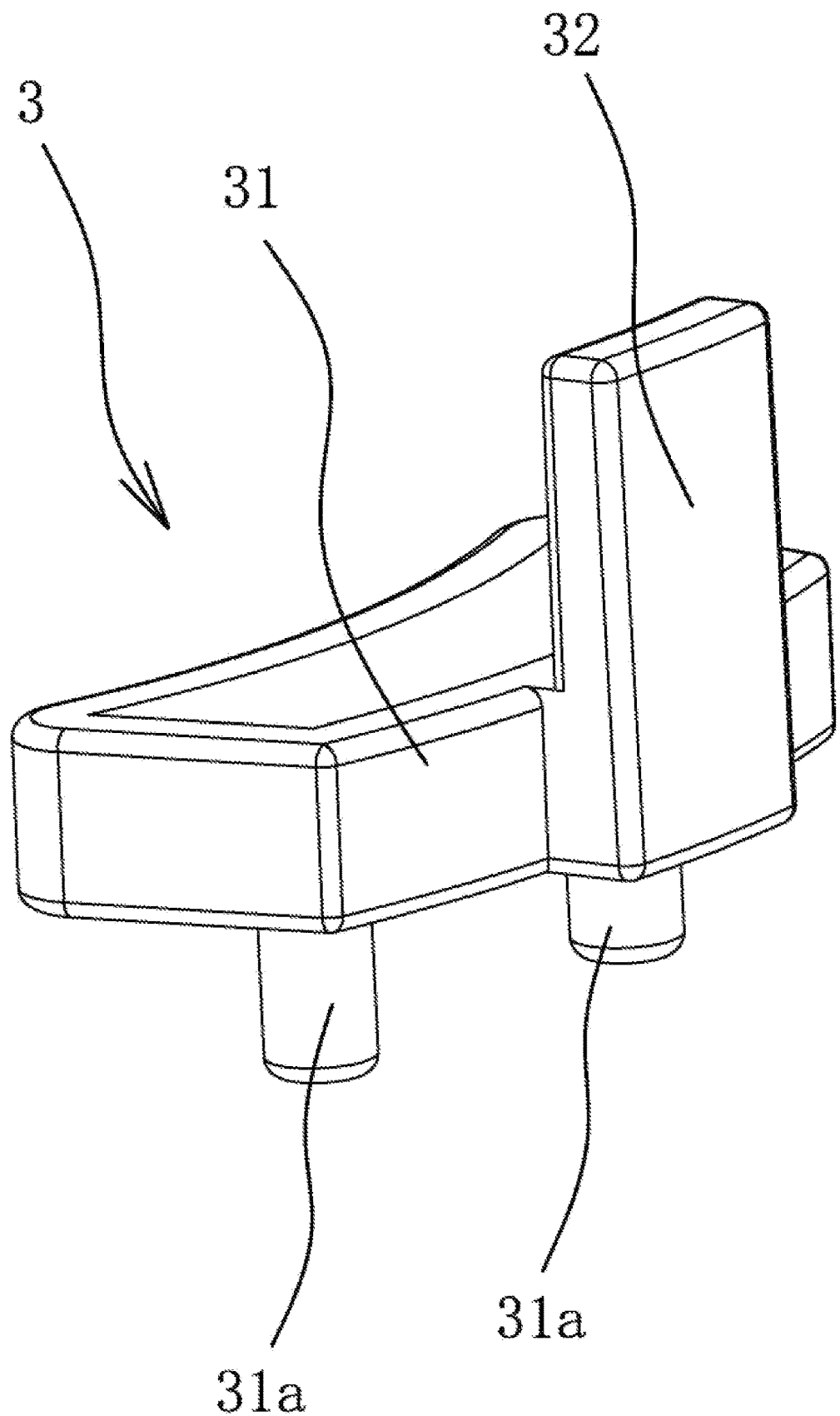
FIG. 7 is a structural schematic diagram of the pressing plate in accordance with the present disclosure.

As shown in FIGS. 1 to 7, a tent top base structure includes a lamp holder 2, and a power storage holder 1 for mounting a power source 11. The lamp holder 2 includes a connecting cover 22 connected to the power storage holder 1, and a lampshade 23 pressed against the connecting cover 22. The power storage holder 1 is detachably connected to the lamp holder 2, and a mounting frame 24 for placing lamp fixtures 21 is arranged in the connecting cover 22.

Figure 8:
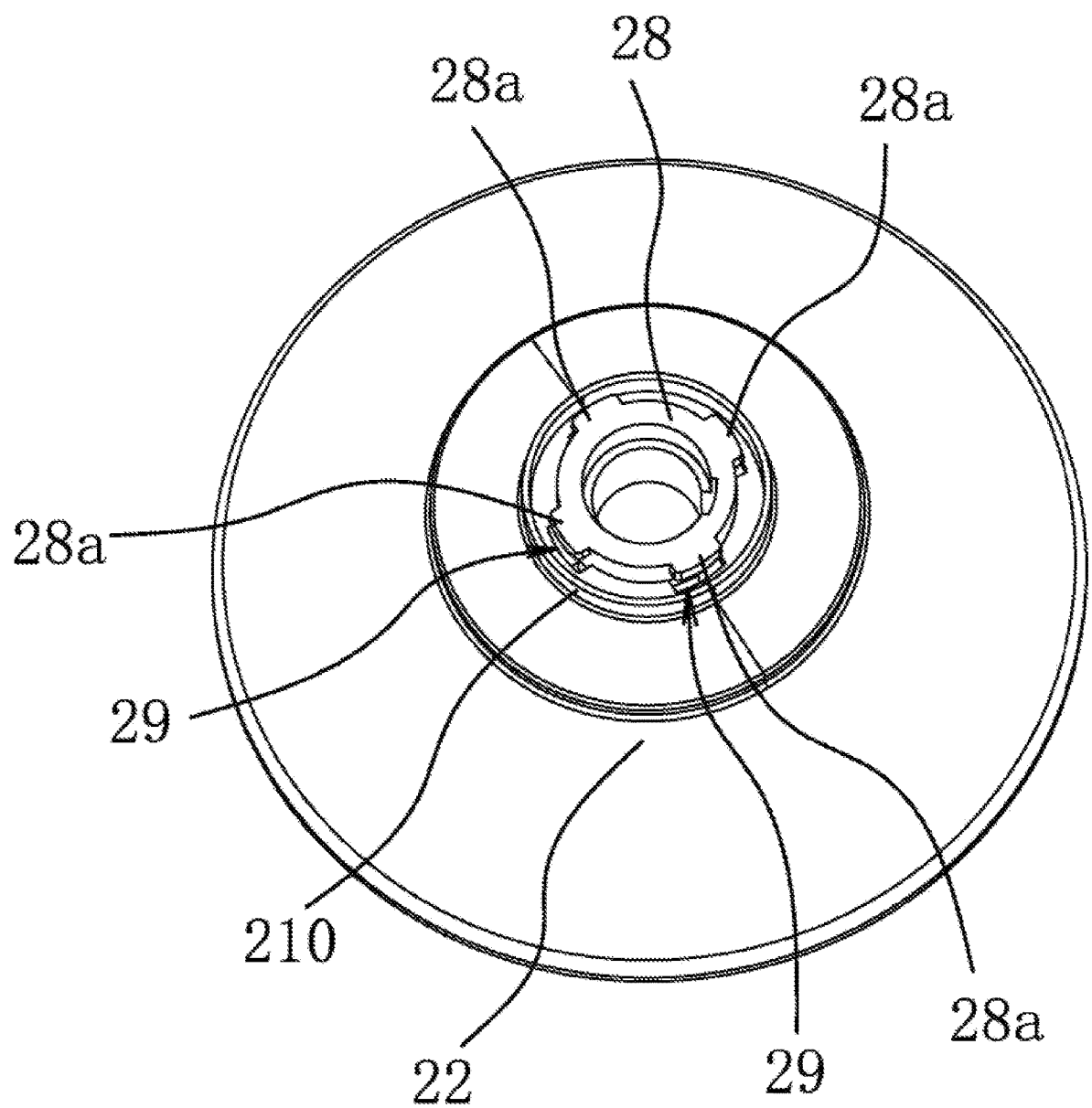
FIG. 8 is a structural schematic diagram of a top view of the connecting cover in accordance with the present disclosure.
Figure 9:
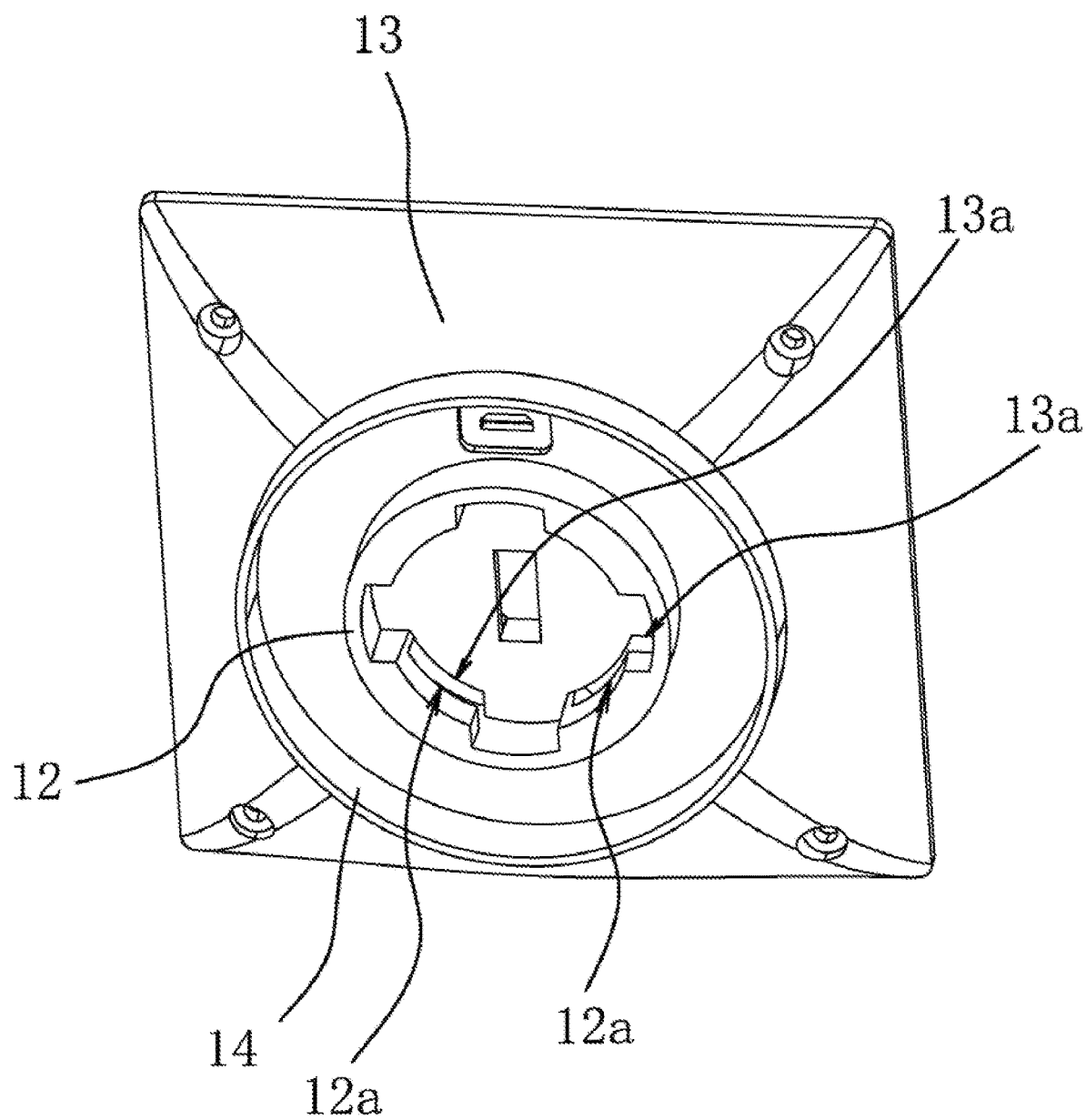
FIG. 9 is a structural schematic diagram of a bottom view of a housing in accordance with the present disclosure.

Specifically, as shown in FIGS. 1 to 9, a wire-passing hole 25 communicating with an inner cavity of the power storage holder 1 is formed in the lamp holder 2. The mounting frame 24 is provided with a first clamping groove 24a with an opening 24b facing downwards. The tent top base structure further includes a pressing plate 3 connected to the lamp holder 2. The pressing plate 3 is partially embedded in the first clamping groove 24a and blocks the opening 24b of the first clamping groove 24a. A wire-passing gap 4, which is configured for an electric wire to pass through and communicates with the wire-passing hole 25, is formed between an upper end of the pressing plate 3 and a top wall of the first clamping groove 24a.

An operation principle of the structure is as follows: a power source 11 in the power storage holder 1 may be a storage battery and/or a solar panel. By forming the first clamping groove 24a with the opening 24b facing downwards in the mounting frame 24 and arranging the pressing plate 3 in the first clamping groove 24a, the opening 24b of the first clamping groove 24a is blocked by the pressing plate 3 at the moment, and the wire-passing gap 4 is formed between the pressing plate 3 and the top wall of the first clamping groove 24a, such that the electric wire of the lamp fixture 21 placed on the mounting frame 24 can pass through the wire-passing gap 4 and the wire-passing hole 25 in turn to enter the power storage holder 1 and is electrically connected to the power source 11 in the power storage holder 1. When the tent top base structure is mounted, a tarpaulin is arranged between the power storage holder 1 and the lamp holder 2, and the whole lamp holder 2 is generally located in the tarpaulin. Therefore, the electric wire can be pressed against the wire-passing gap 4 by the pressing plate 3 during mounting, and damage caused by the contact between the electric wire and an inner housing of the lamp holder 2 during mounting when the electric wire is directly led out from the first clamping groove 24a is avoided. As the electric wire is pressed between the pressing plate 3 and the top wall of the first clamping groove 24a through the cooperative arrangement of the pressing plate 3 and the first clamping groove 24a, it is difficult to touch the electric wire during mounting, the stability of the electric wire during mounting and use is guaranteed, the power supply for the lamp holder 2 is more stable, and the stability of the tent top base structure is further improved.

As shown in FIGS. 1 to 7, the mounting frame 24 includes an annular mounting ring 24c and multiple connecting plates 24d arranged in the mounting ring 24c and connected to an inner side wall of the mounting ring 24c. The central part of the mounting frame 24 is provided with a connecting post 24e, one end of each connecting plate 24d is connected to the connecting post 24e, and the wire-passing hole 25 is formed in the connecting post 24e. Multiple support strips 24c1 are provided on an outer side wall of the mounting ring 24c. The lamp fixture 21 is an annular lamp panel, which is sleeved outside the mounting ring 24c and abuts against the supporting strips 24c1. The first clamping groove 24a is provided on the mounting ring 24c. The pressing plate 3 includes a mounting part 31 arranged on the connecting plates 24d and a clamping part 32 embedded in the first clamping groove 24a. An upper end of the mounting part 31 is protruded to form a positioning post 31a. The connecting plate 24d is provided with a positioning slot 24d1 for the positioning post 31a to be inserted. The lower end face of the clamping part 32 is flush with the lower end face of the mounting ring 24c. The clamping part 32 is in the shape of an arc-shaped plate, an inner side of the clamping part 32 is connected to the mounting part 31, and a side wall of the clamping part 32 adjoins a side wall of the first clamping groove 24a. The pressing plate 3 is pressed against the connecting plates 24d by the lampshade 23. The lamp holder 2 is provided with a guide plate 26 inside the mounting ring 24c, the guide plate 26 is arranged directly opposite to the first clamping groove 24a, and the lower end face of the guide plate 26 is slightly higher than the top wall of the first clamping groove 24a. A guide gap 27 allowing the electric wire to pass through is formed between the lower end of the guide plate 26 and the mounting part 31. The guide plate 26 is arranged between two adjacent connecting plates 24d, two sides of the guide plate 26 are respectively connected to the two connecting plates 24d. The lower end face of the guide plate 26 is a cambered face, the wire-passing hole 25 is arranged obliquely above the guide plate 26, and the wire-passing hole 25 is formed at the center of the connecting cover 22.

As shown in FIGS. 3, 4, 8 and 9, the upper end of the lamp holder 2 is provided with an annular sealing clamping ring 28, and an outer side wall of the sealing clamping ring 28 is provided with multiple clamping blocks 28a in a circumferential direction. The power storage holder 1 is provided with a circular positioning plate 12, and the positioning plate 12 is provided with multiple second clamping grooves 12a with side openings in a circumferential direction. The clamping blocks 28a are slidable into the second clamping groove 12a from respective openings, the lamp holder 2 is provided with a heat dissipation port 29 below each clamping block 28a, and the heat dissipation port 29 communicates with an inner cavity of the lamp holder 2. The power storage holder 1 includes a housing 13, and the positioning plate 12 is arranged on the housing 13. The housing 13 is provided with forming holes 13a each of which corresponds to a corresponding one of the second clamping grooves 12a, and each forming hole 13a communicates with the corresponding second clamping groove 12a. The lamp holder 2 is provided with a sealing ring 210 located outside the sealing clamping ring 28. When the lamp holder 2 is connected to the power storage holder 1, the sealing ring 210 is attached to the outer side wall of the positioning plate 12. The power storage holder 1 is provided with an annular protective ring 14. The protective ring 14 is arranged outside the positioning plate 12. When the lamp holder 2 is connected to the power storage holder 1, the sealing ring 210 is located in the protective ring 14, and an avoidance space 5 is formed between the sealing ring 210 and the protective ring 14.

Embodiment II

The content of this embodiment is basically the same as that of Embodiment I, except that the lamp holder 2 is provided with a circular mounting post, the power storage holder 1 is threaded to the mounting post, and the mounting post is sleeved with a sealing ring.

The specific embodiments described herein are merely illustrative of the spirit of the present disclosure. Those skilled in the art to which the present disclosure pertains may make various modifications or additions to or similarly replace the detailed embodiments described without departing from the spirit of the present disclosure or exceeding the scope defined by the appended claims.

What is claimed is:

1. A tent top base structure, comprising a lamp holder, and a power storage holder for mounting a power supply, wherein the power storage holder is detachably connected to the lamp holder, a mounting frame for placing a lamp fixture is arranged in the lamp holder;
   wherein a wire-passing hole communicating with an inner cavity of the power storage holder is formed in the lamp holder, and the mounting frame is provided with a first clamping groove with an opening facing downwards;
   wherein the tent top base structure further comprises a pressing plate connected to the lamp holder, the pressing plate is partially embedded in the first clamping groove and blocks the opening of the first clamping groove, a wire-passing gap which is configured for an electric wire to pass through is formed between an upper end of the pressing plate and a top wall of the first clamping groove, and the wire-passing gap communicates with the wire-passing hole;
   wherein the mounting frame comprises an annular mounting ring and a plurality of connecting plates arranged in the mounting ring and connected to an inner side wall of the mounting ring, the first clamping groove is formed in the mounting ring, and
   wherein the pressing plate comprises a mounting part arranged on the plurality of connecting plates and a clamping part embedded in the first clamping groove, and a lower end face of the clamping part is flush with a lower end face of the mounting ring.

2. The tent top base structure according to claim 1, wherein the lamp holder comprises a connecting cover connected to the power storage holder, and a lampshade pressed against the connecting cover, the mounting frame is arranged on the connecting cover, the clamping part is in a shape of an arc-shaped plate, an inner side of the clamping part is connected to the mounting part, a side wall of the clamping part adjoins a side wall of the first clamping groove, and the pressing plate is pressed against the plurality of connecting plates by the lampshade.

3. The tent top base structure according to claim 2, wherein the lamp holder is provided with a guide plate inside the mounting ring, the guide plate is arranged directly opposite to the first clamping groove, a lower end face of the guide plate is slightly higher than the top wall of the first clamping groove, and a guide gap allowing the electric wire to pass through is formed between a lower end of the guide plate and the mounting part.

4. The tent top base structure according to claim 3, wherein the guide plate is arranged between two adjacent connecting plates, two sides of the guide plate are respectively connected to the two adjacent connecting plates, and a lower end face of the guide plate is a cambered face.

5. The tent top base structure according to claim 4, wherein an upper end of the mounting part is protruded to form a positioning post, and each of the plurality of connecting plates is provided with a positioning slot for the positioning post to be inserted.

6. The tent top base structure according to claim 4, wherein an upper end of the lamp holder is provided with an annular sealing clamping ring, an outer side wall of the sealing clamping ring is provided with a plurality of clamping blocks in a circumferential direction,
   wherein the power storage holder is provided with a circular positioning plate, and the positioning plate is provided with a plurality of second clamping grooves with side openings in a circumferential direction; the clamping blocks are slidable into the plurality of second clamping grooves from respective openings, and the lamp holder is provided with a heat dissipation port below each of the clamping blocks, and the heat dissipation port communicates with an inner cavity of the lamp holder.

7. The tent top base structure according to claim 3, wherein an upper end of the mounting part is protruded to form a positioning post, and each of the plurality of connecting plates is provided with a positioning slot for the positioning post to be inserted.

8. The tent top base structure according to claim 3, wherein an upper end of the lamp holder is provided with an annular sealing clamping ring, an outer side wall of the sealing clamping ring is provided with a plurality of clamping blocks in a circumferential direction,
   wherein the power storage holder is provided with a circular positioning plate, and the positioning plate is provided with a plurality of second clamping grooves with side openings in a circumferential direction; the clamping blocks are slidable into the plurality of second clamping grooves from respective openings, and the lamp holder is provided with a heat dissipation port below each of the clamping blocks, and the heat dissipation port communicates with an inner cavity of the lamp holder.

9. The tent top base structure according to claim 8, wherein the power storage holder comprises a housing, the positioning plate is arranged on the housing, and the housing is provided with forming holes each of which corresponds to a corresponding one of the plurality of second clamping grooves, and each of the forming holes communicates with the corresponding one of the plurality of second clamping grooves.

10. The tent top base structure according to claim 2, wherein an upper end of the mounting part is protruded to form a positioning post, and each of the plurality of connecting plates is provided with a positioning slot for the positioning post to be inserted.

11. The tent top base structure according to claim 2, wherein an upper end of the lamp holder is provided with an annular sealing clamping ring, an outer side wall of the sealing clamping ring is provided with a plurality of clamping blocks in a circumferential direction,
wherein the power storage holder is provided with a circular positioning plate, and the positioning plate is provided with a plurality of second clamping grooves with side openings in a circumferential direction; the clamping blocks are slidable into the plurality of second clamping grooves from respective openings, and the lamp holder is provided with a heat dissipation port below each of the clamping blocks, and the heat dissipation port communicates with an inner cavity of the lamp holder.

12. The tent top base structure according to claim 11, wherein the power storage holder comprises a housing, the positioning plate is arranged on the housing, and the housing is provided with forming holes each of which corresponds to a corresponding one of the plurality of second clamping grooves, and each of the forming holes communicates with the corresponding one of the plurality of second clamping grooves.

13. The tent top base structure according to claim 1, wherein an upper end of the mounting part is protruded to form a positioning post, and each of the plurality of connecting plates is provided with a positioning slot for the positioning post to be inserted.

14. The tent top base structure according to claim 1, wherein an upper end of the lamp holder is provided with an annular sealing clamping ring, an outer side wall of the sealing clamping ring is provided with a plurality of clamping blocks in a circumferential direction,
wherein the power storage holder is provided with a circular positioning plate, and the positioning plate is provided with a plurality of second clamping grooves with side openings in a circumferential direction; the clamping blocks are slidable into the plurality of second clamping grooves from respective openings, and the lamp holder is provided with a heat dissipation port below each of the clamping blocks, and the heat dissipation port communicates with an inner cavity of the lamp holder.

15. The tent top base structure according to claim 14, wherein the power storage holder comprises a housing, the positioning plate is arranged on the housing, and the housing is provided with forming holes each of which corresponds to a corresponding one of the plurality of second clamping grooves, and each of the forming holes communicates with the corresponding one of the plurality of second clamping grooves.

16. The tent top base structure according to claim 14, wherein the lamp holder is provided with a sealing ring located outside the sealing clamping ring, and in a case where the lamp holder is connected to the power storage holder, the sealing ring is attached to an outer side wall of the positioning plate.

17. The tent top base structure according to claim 16, wherein the power storage holder is provided with an annular protective ring, the protective ring is arranged outside the positioning plate, and in the case where the lamp holder is connected to the power storage holder, the sealing ring is located in the protective ring, and an avoidance space is formed between the sealing ring and the protective ring.

\* \* \* \* \*